US012398605B2

(12) United States Patent
Guerrero et al.

(10) Patent No.: US 12,398,605 B2
(45) Date of Patent: Aug. 26, 2025

(54) BIASER, METHOD AND SYSTEM

(71) Applicant: Baker Hughes Oilfield Operations LLC, Houston, TX (US)

(72) Inventors: Carlos Manuel Guerrero, Querétaro (MX); Wilfred Provost, Tomball, TX (US); Joshua Raymond Snitkoff, Friendswood, TX (US); Chad Yates, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 18/347,033

(22) Filed: Jul. 5, 2023

(65) Prior Publication Data
US 2025/0012155 A1 Jan. 9, 2025

(51) Int. Cl.
*E21B 23/00* (2006.01)
*F16F 1/373* (2006.01)

(52) U.S. Cl.
CPC .............. *E21B 23/00* (2013.01); *F16F 1/373* (2013.01)

(58) Field of Classification Search
CPC .................................. E21B 23/00; F16F 1/373
See application file for complete search history.

(56) References Cited

U.S. PATENT DOCUMENTS

| 6,710,600 B1 * | 3/2004 | Kopecki ................. E21B 47/01 |
| | | 175/320 |
| 2004/0065445 A1 | 4/2004 | Abercrombie Simpson et al. |
| 2009/0066030 A1 | 3/2009 | Avant et al. |
| 2009/0102106 A1 | 4/2009 | Ohashi et al. |
| 2018/0252054 A1 * | 9/2018 | Stokes ................. E21B 19/166 |
| 2021/0270090 A1 * | 9/2021 | Lehr ....................... E21B 17/00 |
| 2022/0042566 A1 * | 2/2022 | Burr ......................... A42B 3/12 |
| 2022/0056979 A1 | 2/2022 | Oomen et al. |
| 2022/0106996 A1 | 4/2022 | Goettke et al. |
| 2022/0381311 A1 | 12/2022 | Jeng et al. |
| 2023/0065177 A1 * | 3/2023 | Ostermann ........... E21B 47/017 |

OTHER PUBLICATIONS

Notification of Transmittal of the International Search Report and the Written Opinion of the International Searching Authority, or the Declaration; PCT/US2024/036485; Mail date: Oct. 21, 2024; 7 pages.

* cited by examiner

*Primary Examiner* — Nicole Coy
*Assistant Examiner* — Jennifer A Railey
(74) *Attorney, Agent, or Firm* — Baker Hughes Patent Organization

(57) ABSTRACT

A biaser including a tubular body having a longitudinal axis, an outside surface, and an inside surface. A first plurality of openings extend from the outside surface to the inside surface, with adjacent ones of the openings each defining a beam extending at a first angle other than along the tubular body axis. A second plurality of openings in the body extend from the outside surface to the inside surface, with adjacent ones of the openings each defining a beam extending at a second angle that is other than along the tubular body axis and other than at the first angle. A method for making the biaser, includes depositing material and fusing the material together according to the geometry of the biaser.

20 Claims, 7 Drawing Sheets

BIASER, METHOD AND SYSTEM

BACKGROUND

In the resource recovery and fluid sequestration industries biasing devices such as springs are often needed to actuate tools in the downhole environment. Some of these are quite adept at managing the duty to which they are put while others may not be. Unequivocally there are myriad operations for which a biasing device might be helpful but for which no suitable device presently exists. Maximization in efficiencies are always desirable. For this reason, the art is always receptive to advancements.

SUMMARY

An embodiment of a biaser including a tubular body having a longitudinal axis and having an outside surface and an inside surface, a first plurality of openings in the body extending from the outside surface to the inside surface, adjacent ones of the openings each defining a beam extending at a first angle other than along the tubular body axis, and a second plurality of openings in the body extending from the outside surface to the inside surface, adjacent ones of the openings each defining a beam extending at a second angle that is other than along the tubular body axis and other than at the first angle.

An embodiment of a method for making the biaser, including depositing material in a desired location and fusing the material together according to the geometry of the biaser.

An embodiment of a borehole system including a borehole in a subsurface formation, a string in the borehole, a biaser disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
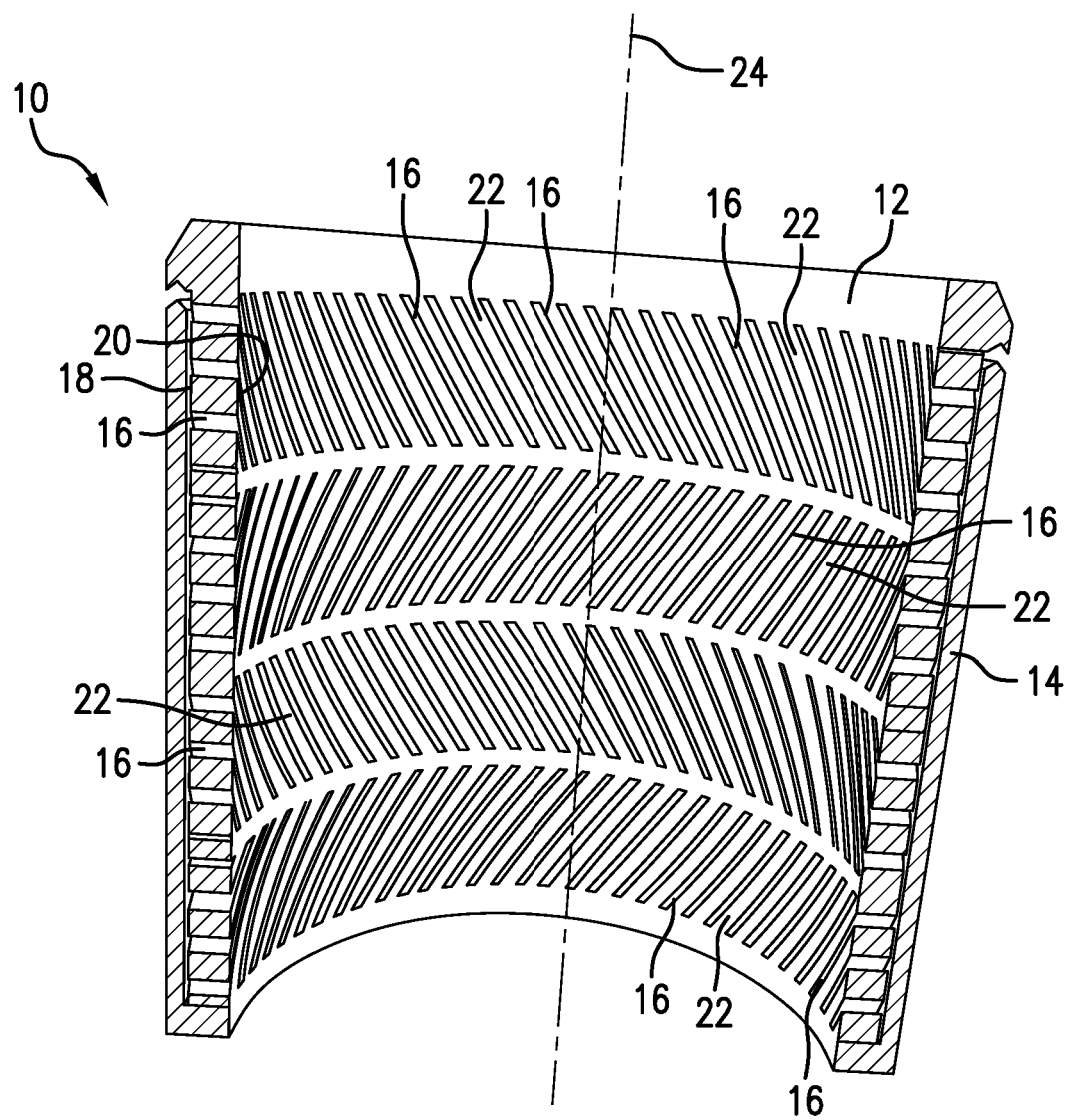
FIG. 1 is a sectional view of a biaser as disclosed herein.
Figure 2:
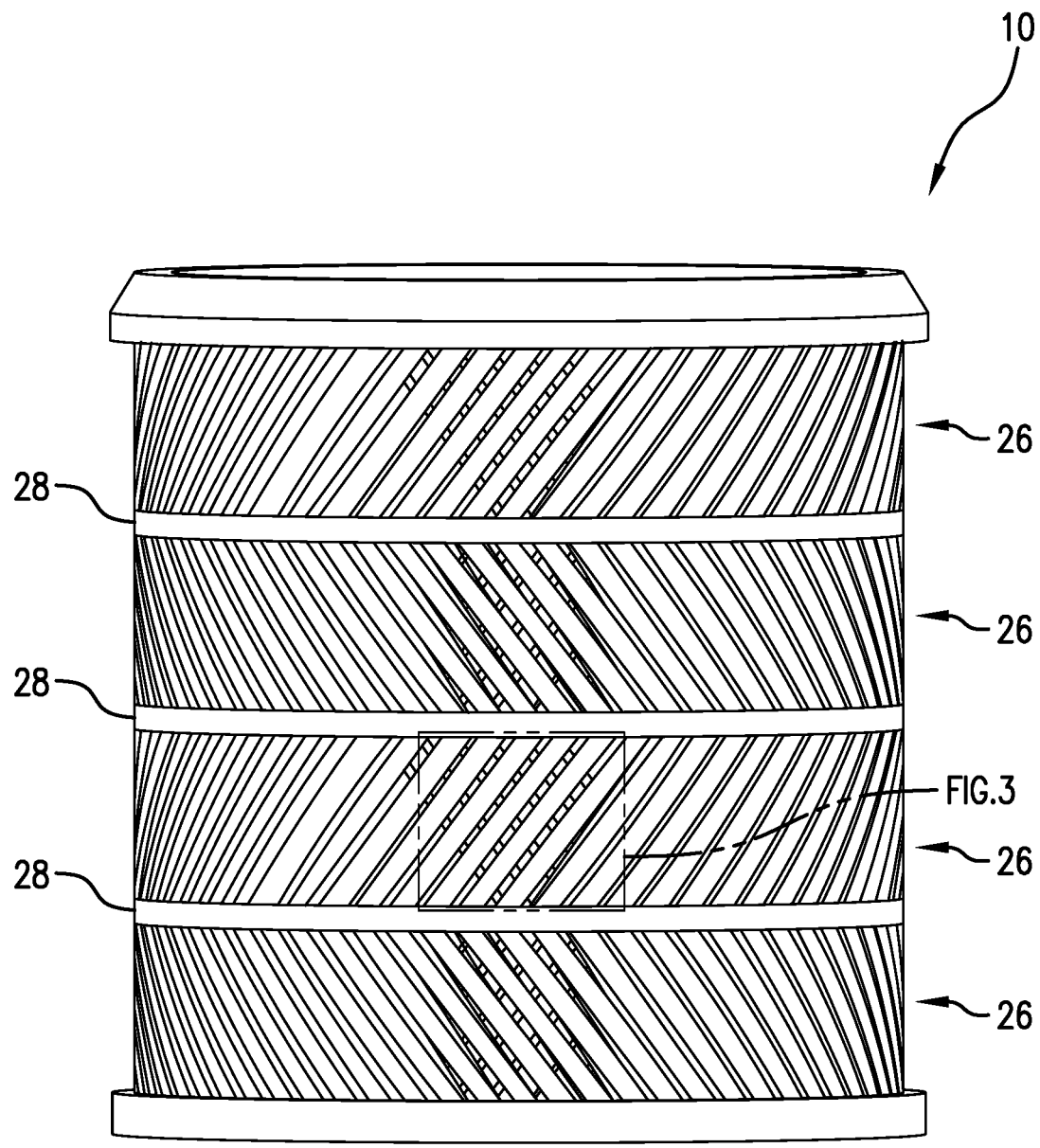
FIG. 2 is a view of a tubular body of the biaser of FIG. 1.
Figure 3:
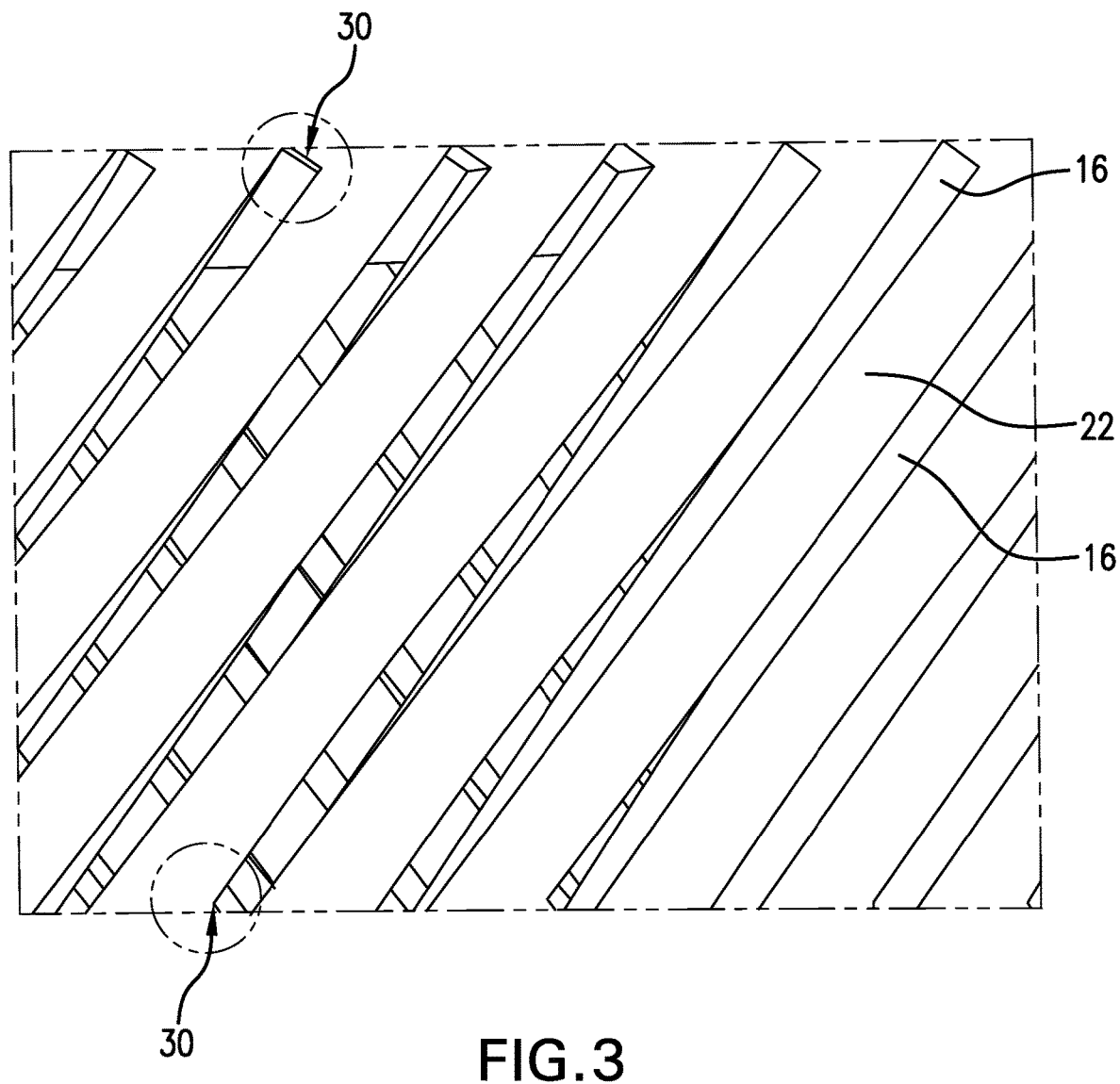
FIG. 3 is an enlarged section of a portion of the view of FIG. 2.

Referring to FIG. 1, a sectional view of a biaser 10 is illustrated. Biaser 10 includes a tubular body 12 and may also in some embodiments may optionally include, a second tubular structure 14 that may be positioned either radially inwardly of the body 12 or radially outwardly of the body 12. As illustrated the structure 14 is positioned radially outwardly of the body 12. Structure 14 may be configured as a compression limiter, an extension limiter or both as desired in various embodiments. Structure 14 may be integral with one end of the body 12 and mobile with respect to the opposite end of the body 12 or may be geometrically interlocked with an interference fit to one end of the body or may be geometrically loosely interlocked both ends of the body 12. As used herein, the term "geometrically loosely interlocked" is meant to convey that two components are not separable in the ordinary course from one another but that they can move relative to one another due to clearance in the connection therebetween. For example, a dovetail connection may be considered geometrically loosely interlocked if the dovetail dimensions are loose rather than an interference fit. A loose dimension connection will create a joint that can move about to some degree while still not ordinarily coming completely apart. Structure 14 may be solid walled or may have openings therein as desired. Dimensions of the structure 14 will take into account its construction (integral or not), potential movement afforded in its connection with the body 12, and its overall longitudinal axial length so that compression of the body 12 is limited to a selected degree and/or extension of the body 12 is limited to a selected degree.

Figure 4:
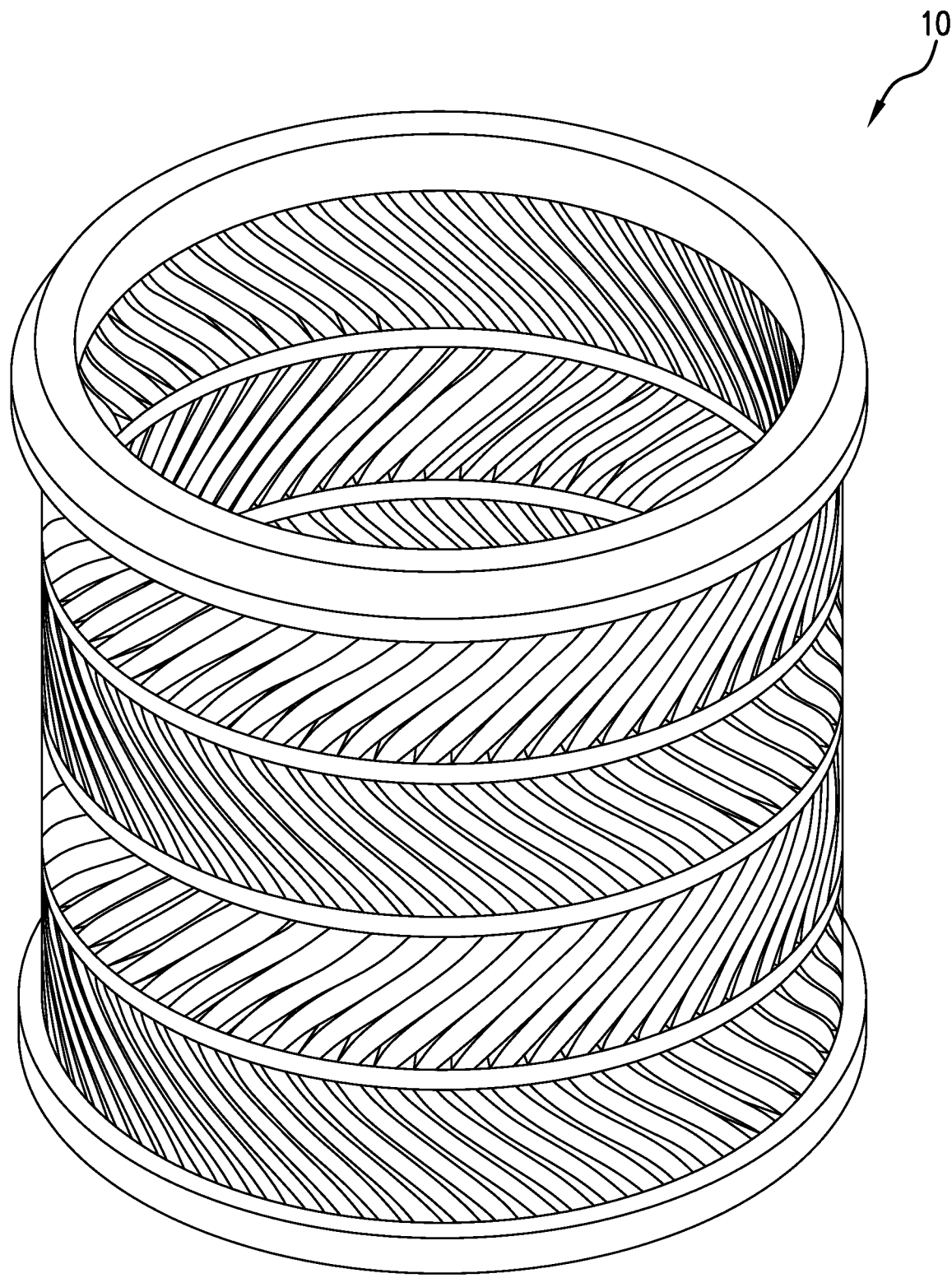
FIG. 4 is a view of the tubular body of the biaser in a compressed state.

Returning to the body 12, it will be appreciated from the Figures herein that the body 12 includes a plurality of openings 16 that extend from an outside surface 18 of the body 12 through the body 12 to an inside surface 20 of the body 12. Between adjacent openings 16 are beams 22. The openings 16, and accordingly the beams 22, are arranged at an angle to a longitudinal axis 24 of the body 12. Angles range from about 30 degrees to about 75 degrees, and in some cases could range from about 40 to about 60 degrees, from an orthogonal plane of the axis 24 and therefore each define a segment of a helix. In an embodiment, the angle is 45 degrees. In another embodiment, the angle is 53 degrees. The beams 22 allow for deflection when the body 12 is compressed (see FIG. 4, for example) or deflection in opposite direction when the body is extended. In either case, the beams are maintained in an elastic range of deformation so that spring rate and repeatability are retained.

Where only one bank 26 of beams 22 exists in the body 12, a torsional reaction will occur pursuant to axial input whether compressional or tensile. In embodiments, such torsional movement is to be avoided, and in such embodiments, more than one bank 26 of beams 22 is used. In the figures hereof, four banks 26 of beams 22 are illustrated. Even numbers of banks 26 with opposing angles will negate torsional reaction of the body 12. This example is a simple case and it is to be appreciated that more complex cases can also result in a net zero torsional reaction even if adjacent banks 26 are not mirrored angles. Rather, the net zero torsional reaction merely requires that when all banks 26 in a particular embodiment are summed, the result is zero net torsional reaction.

As illustrated, the banks 26 are separated by a ring 28 of material that is orthogonally positioned relative to the axis 24. Also, in embodiments, chamfers and/or rounded edges 30 are provided on the beams 22 to reduce stress risers and improve service life of the biaser 10.

The biaser 10 is manufacturable either substantively or more easily additively. It will be appreciated by those of skill in the art that the angle range of 30 to 75 degrees from the orthogonal to the axis 24 is within the tolerance for a build plate additive manufacturing method and easily can hold tight tolerances. With additive manufacture methods, the structure 14 may be printed along with the body 12.

Figure 5:
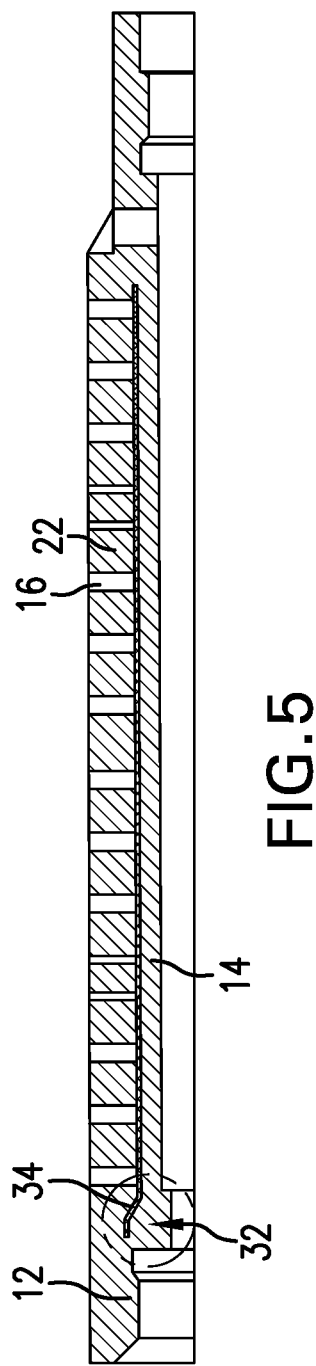
FIG. 5 is a sectional view of the biaser of FIG. 1 in an as printed condition.
Figure 6:
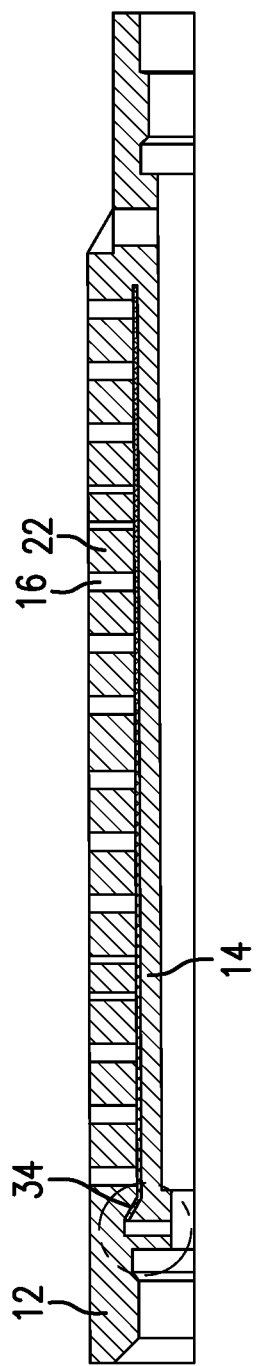
FIG. 6 is the view of FIG. 5 in a completed condition.

Referring to FIGS. 5 and 6, an embodiment where the structure 14 is radially inwardly disposed of the body 12 is printed to be integral with the body 12. If left in the condition of FIG. 5, the biaser 10 would not work because there is a solid connection from one end to the other end through structure 14 that does not provide for deflection. This embodiment is easily post treated however with a simply milling operation to remove material shown at numeral 32 in FIG. 5 and missing in FIG. 6 to that the biaser 10 may be extended and compressed to the degree that material was removed in the milling operation. It should also be appreciated that the illustrated embodiment includes a tensile stopper 34. Embodiments may or may not include this stopper depending upon whether or not extension limit is desired.

While FIGS. 5 and 6 illustrate only the structure 14 radially inwardly of the body 12 it will be easily appreciated by those of skill that the structure 14 could be radially outwardly disposed and the milling operation noted could occur from the outside of the biaser 10.

Figure 7:
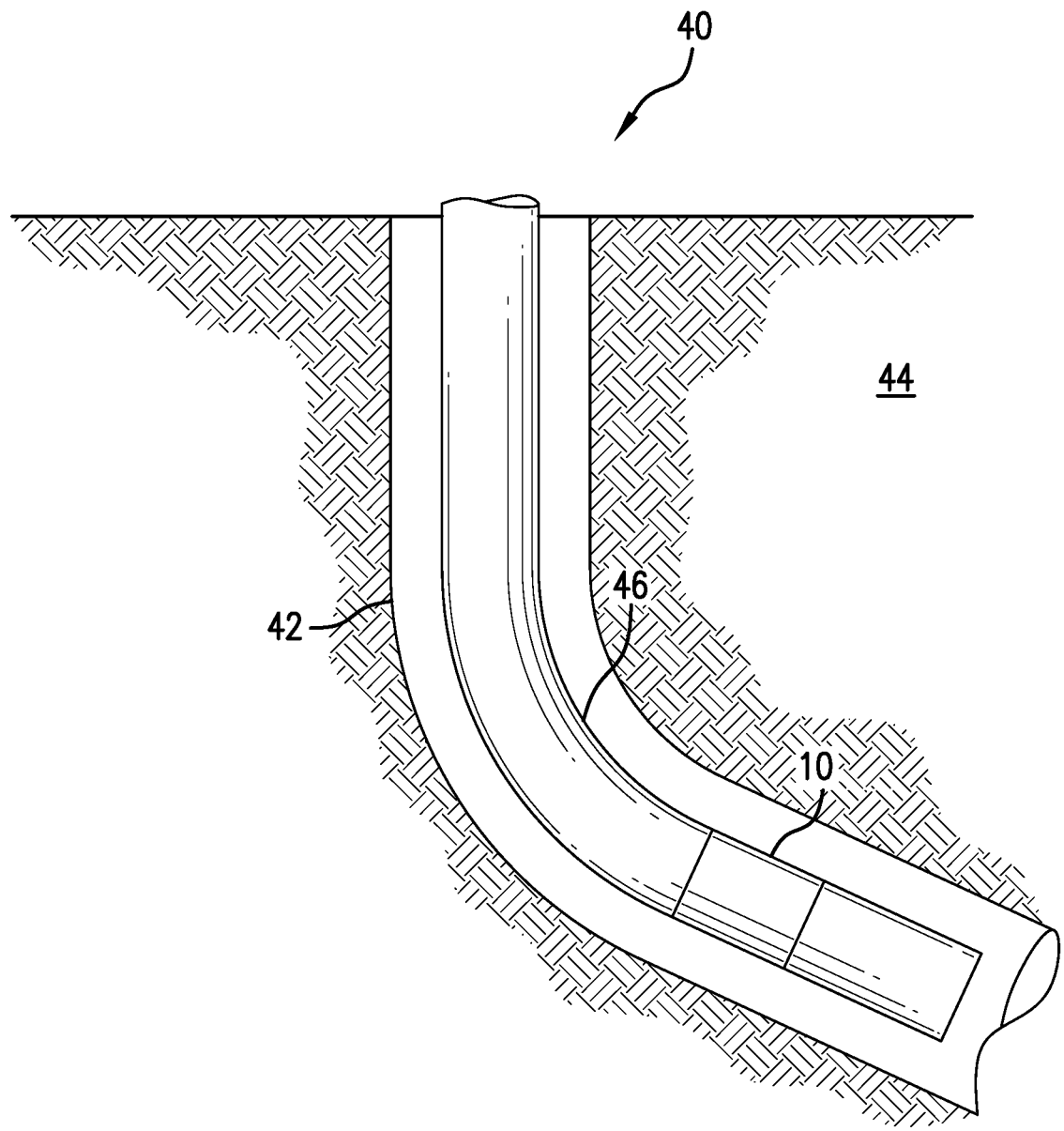
FIG. 7 is a view of a borehole system including the biaser as disclosed herein.

Referring to FIG. 7, a borehole system 40 is illustrated. The system 40 comprises a borehole 42 in a subsurface formation 44. A string 46 is disposed within the borehole 40. A biaser 10 as disclosed herein is disposed within or as a part of the string 46.

Set forth below are some embodiments of the foregoing disclosure:

Embodiment 1: A biaser including a tubular body having a longitudinal axis and having an outside surface and an inside surface, a first plurality of openings in the body extending from the outside surface to the inside surface, adjacent ones of the openings each defining a beam extending at a first angle other than along the tubular body axis, and a second plurality of openings in the body extending from the outside surface to the inside surface, adjacent ones of the openings each defining a beam extending at a second angle that is other than along the tubular body axis and other than at the first angle.

Embodiment 2: The biaser as in any prior embodiment, wherein the first plurality of openings and the second plurality of openings are longitudinally spaced from one another.

Embodiment 3: The biaser as in any prior embodiment, further comprising additional pluralities of openings longitudinally spaced from one another, each additional plurality of openings having a beam extending in the first or second direction opposite of the next adjacent longitudinally spaced plurality of openings.

Embodiment 4: The biaser as in any prior embodiment, wherein the number of pluralities is even such that the body when compressed or stretched is substantially nontorsional.

Embodiment 5: The biaser as in any prior embodiment, at least one of the plurality of openings is helically arranged.

Embodiment 6: The biaser as in any prior embodiment, wherein the first angle and the second angle are mirror images of one another.

Embodiment 7: The biaser as in any prior embodiment, wherein the first angle is measured from an orthogonal plane to the longitudinal axis of the body is from about 30* to about 75*.

Embodiment 8: The biaser as in any prior embodiment, wherein the first angle and second angle measured from an orthogonal plane to the longitudinal axis of the body is from about 40* to about 60*.

Embodiment 9: The biaser as in any prior embodiment, wherein the second angle measured from an orthogonal plane to the longitudinal axis of the body is from about 30* to about 75*.

Embodiment 10: The biaser as in any prior embodiment, further comprising a second tubular structure disposed adjacent the body and secured to the body to limit compression and/or extension of the body.

Embodiment 11: The biaser as in any prior embodiment, wherein the second tubular structure is separate from the body and geometrically loosely interlocked with the body.

Embodiment 12: The biaser as in any prior embodiment, wherein the second tubular structure is a part of the body at one end of the second tubular structure.

Embodiment 13: The biaser as in any prior embodiment, wherein an opposite end of the second tubular structure is geometrically loosely interlocked with the body.

Embodiment 14: The biaser as in any prior embodiment, wherein the second tubular structure is radially outwardly disposed of the body.

Embodiment 15: The biaser as in any prior embodiment, wherein the second tubular structure is radially inwardly disposed of the body.

Embodiment 16: The biaser as in any prior embodiment, further comprising configuring the plurality of openings to reduce stress risers in the beam.

Embodiment 17: The biaser as in any prior embodiment, wherein the configuring is a rounded end of the beam.

Embodiment 18: The biaser as in any prior embodiment, wherein the configuring is a chamfered end of the beam.

Embodiment 19: A method for making the biaser as in any prior embodiment, including depositing material in a desired location and fusing the material together according to the geometry of the biaser.

Embodiment 20: A borehole system including a borehole in a subsurface formation, a string in the borehole, a biaser as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" includes a range of ±8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A biaser comprising:
   a tubular body having a longitudinal axis and having an outside surface and an inside surface;
   a first bank having a first longitudinal end of the first bank and a second longitudinal end of the first bank and defining a first plurality of openings in the body extending from the outside surface to the inside surface, adjacent ones of the openings each defining a beam extending at a first angle other than along the tubular body axis and other than orthogonal to the tubular body axis, the first end of the first bank configured to exhibit torsional movement relative to the second end of the first bank upon compression or tension applied to the first bank; and
   a second bank having a first longitudinal end of the second bank and a second longitudinal end of the second bank and defining a second plurality of openings in the body extending from the outside surface to the inside surface, adjacent ones of the openings each defining a beam extending at a second angle that is other than along the tubular body axis, other than at the first angle, and other than orthogonal to the tubular body axis, the first end of the second bank configured to exhibit torsional movement relative to the second end of the second bank upon compression or tension applied to the second bank.

2. The biaser as claimed in claim 1, wherein the first plurality of openings and the second plurality of openings are longitudinally spaced from one another.

3. The biaser as claimed in claim 1, further comprising additional pluralities of openings longitudinally spaced from one another, each additional plurality of openings having a beam extending in the first or second direction opposite of the next adjacent longitudinally spaced plurality of openings.

4. The biaser as claimed in claim 1, wherein individual banks collectively substantially cancel the torsional movement within the biaser.

5. The biaser as claimed in claim 1, at least one of the plurality of openings is helically arranged.

6. The biaser as claimed in claim 1, wherein the first angle and the second angle are mirror images of one another.

7. The biaser as claimed in claim 1, wherein the first angle is measured from an orthogonal plane to the longitudinal axis of the body is from about 30° to about 75°.

8. The biaser as claimed in claim 1, wherein the first angle and second angle measured from an orthogonal plane to the longitudinal axis of the body is from about 40° to about 60°.

9. The biaser as claimed in claim 7, wherein the second angle measured from an orthogonal plane to the longitudinal axis of the body is from about 30° to about 75°.

10. The biaser as claimed in claim 1, further comprising a second tubular structure disposed adjacent the body and secured to the body to limit compression and/or extension of the body.

11. The biaser as claimed in claim 10, wherein the second tubular structure is separate from the body and geometrically loosely interlocked with the body.

12. The biaser as claimed in claim 10, wherein the second tubular structure is a part of the body at one end of the second tubular structure.

13. The biaser as claimed in claim 12, wherein an opposite end of the second tubular structure is geometrically loosely interlocked with the body.

14. The biaser as claimed in claim 10, wherein the second tubular structure is radially outwardly disposed of the body.

15. The biaser as claimed in claim 10, wherein the second tubular structure is radially inwardly disposed of the body.

16. The biaser as claimed in claim 1, further comprising configuring the plurality of openings to reduce stress risers in the beam.

17. The biaser as claimed in claim 16, wherein the configuring is a rounded end of the beam.

18. The biaser as claimed in claim 16, wherein the configuring is a chamfered end of the beam.

19. A method for making the biaser as claimed in claim 1, comprising:
   depositing material in a desired location and fusing the material together according to the geometry of the biaser.

20. A borehole system comprising:
   a borehole in a subsurface formation;
   a string in the borehole;
   a biaser as claimed in claim 1 disposed within or as a part of the string.

* * * * *